United States Patent
Wood

[19]

[11] Patent Number: 5,890,725
[45] Date of Patent: Apr. 6, 1999

[54] AIR PUMP FOR BICYCLES

[76] Inventor: Neil L. Wood, 420 Melrose Ave., Apt. 610, Chicago, Ill. 60657

[21] Appl. No.: 814,738

[22] Filed: Mar. 7, 1997

Related U.S. Application Data

[63] Continuation-in-part of Ser. No. 368,092, Jan. 4, 1995, abandoned.

[51] Int. Cl.⁶ ..................................................... B62J 11/02
[52] U.S. Cl. ........................................................... 280/201
[58] Field of Search .................................... 280/201, 216; 417/229, 231, 234

[56] References Cited

U.S. PATENT DOCUMENTS

| | | | |
|---|---|---|---|
| 631,773 | 8/1899 | Bubb | 280/201 |
| 632,696 | 9/1899 | Buxbaum | 280/201 |
| 633,943 | 9/1899 | Austin | 280/201 |
| 849,227 | 4/1907 | Genelly et al. | 280/201 |
| 1,091,435 | 3/1914 | Johnson | 280/201 |
| 5,131,671 | 7/1992 | Wilhelms | 280/201 |

*Primary Examiner*—Kevin Hurley

[57] ABSTRACT

An air pump assembly for a bicycle includes pump components contained within a tubular frame member of the bicycle. A handle extends through a slot in the bicycle frame for access to an operator, although a motor or solenoid contained in the bicycle frame could also be used.

10 Claims, 1 Drawing Sheet

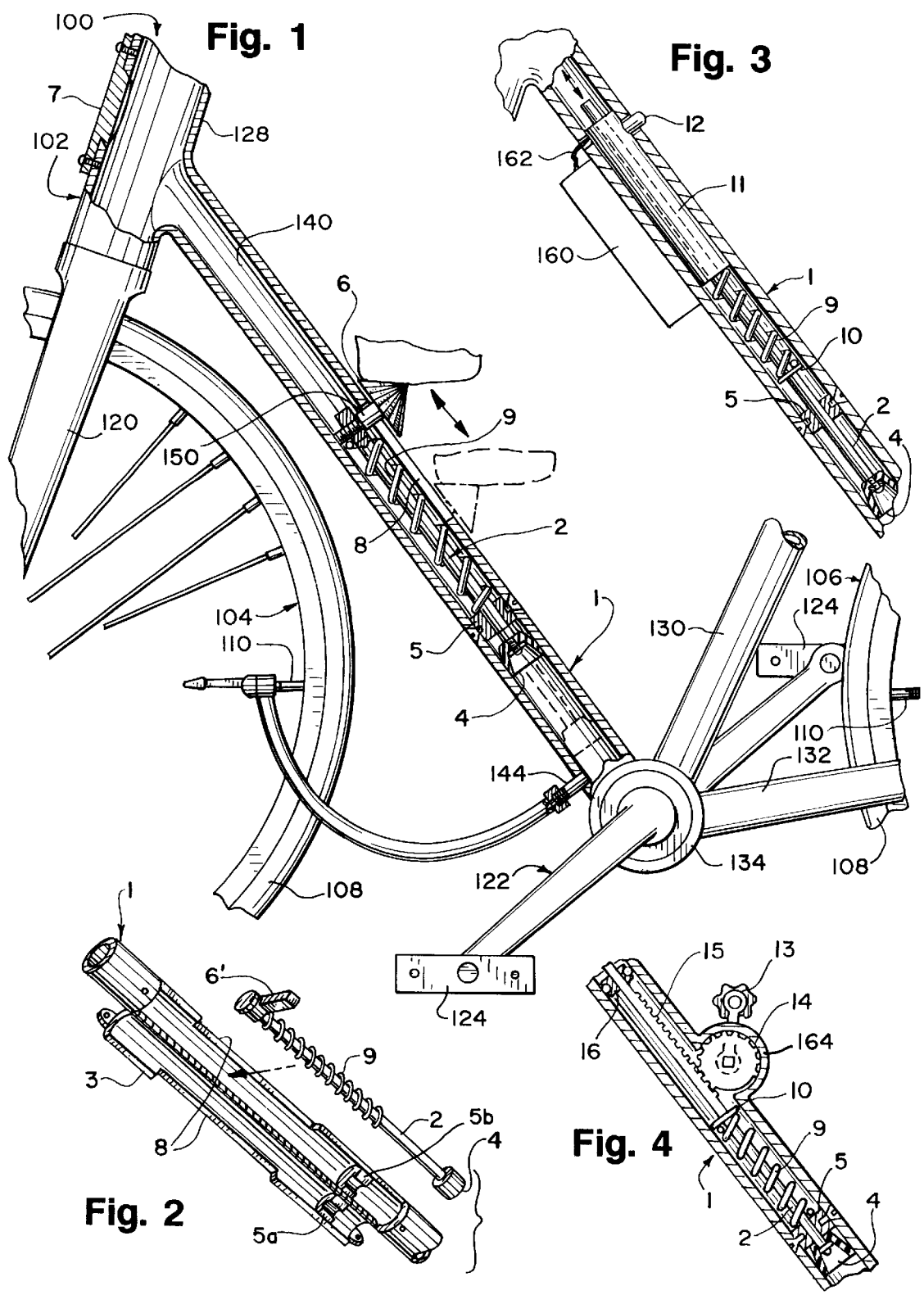

AIR PUMP FOR BICYCLES

CROSS-REFERENCE TO RELATED APPLICATION

This is a continuation-in-part of application Ser. No. 368,092 filed Jan. 4, 1995, now abandoned.

BACKGROUND OF THE INVENTION

1. Field Of The Invention

The present invention relates to bicycle hand pumps, and more specifically to the front tubes of the bicycle frame. The front tubes extend downwardly and they carry no seat post. Bicycle wheels normally need air from time to time and for this purpose hand operated air pumps may be attached to the bicycle, or, if small enough, may be carried on the person. These pumps add weight and are awkward to handle, especially for women and children. They are not an integral part of the bicycle, nor are they motorized or driven by foot.

SUMMARY OF THE INVENTION

In view of the above situation, it is the primary object of the present invention to make a bicycle pump which is an integral part of the bicycle, and either motorized or driven by foot or by hand.

A better understanding of the invention may be gained by reference to the accompanying drawing, in which FIG. 1 draws a fragmentary view of a bicycle with a plunger in its frame and demonstrated in the act of pumping air into the front wheel of the bicycle tire.

A plunger with a foot pedal attached to its upper portion is surrounded by a spring and a leather cup attached to its lower portion. The air pump barrel has a gate open, with a portion of a pump gland attached to the gate portion, and a portion of the gland attached to the frame. The pump assembly further includes a plunger with a leather cup attached to the lower portion of said plunger. Relative motion is developed between the gland and the lower portion of the frame, forcing air out of the frame. Trapped air between the bottom of said frame and the leather cup acts to force the leather cup to engage the sides of said frame, causing said leather cup to act as a barrier to the trapped air on the downward action of said leather cup, allowing the trapped air to flow only from the air outlet at the bottom of the frame. Air pressure above the leather cup forces the leather cup to disengage the sides of the frame, bypassing said leather cup, and filling the frame upon the upward action of said leather cup.

The plunger also includes a foot pedal attached to its upper portion to negate the upward force of the spring. The foot pedal screws out to allow passage through a fork handlebar stem frame opening. A slot in the side portion of the frame allows downward and upward motion of foot pedal.

Alternatively, a solenoid or tubular motor within the frame is coupled to the plunger to draw the upward portion of the plunger up through its magnetic body, causing the spring to uncoil, and bringing up the leather cup from the lower end of said plunger, thus filling said frame with air. A button is provided for shutting off the electric current to the solenoid and cutting the magnetic force holding the plunger, with the spring recoiling, driving said leather cup down, forcing air out of the frame and into the bicycle tire.

Alternatively, a partial circular gear is housed in a special half circular housing carried by the center portion of the frame, engaging the upper portion of said plunger. The upper portion of the plunger has teeth to engage said gear teeth. In winding one gear, the plunger teeth force said plunger down, recoiling said spring. When an untoothed portion of the gear reaches the plunger teeth, the coiled spring is released, and uncoils, forcing the plunger upward. The leather cup attached to the lower portion of the plunger forces air into the frame upon upward action of the spring, and forces air out of the tube upon downward action of the spring.

BRIEF DESCRIPTION OF THE DRAWINGS

FIG. 1 is a fragmentary elevational view, shown partly in cross section, of a bicycle with a first embodiment of an air pump assembly according to the principles of the present invention;

FIG. 2 is an exploded fragmentary perspective view thereof;

FIG. 3 shows a further embodiment of an air pump assembly; and

FIG. 4 is a fragmentary cross-sectional view showing another embodiment of an air pump assembly.

DETAILED DESCRIPTION OF THE PREFERRED EMBODIMENTS

Referring now to the drawings, and initially to FIG. 1, a bicycle is generally indicated at 100, and includes a bicycle frame generally indicated at 102. Bicycle 100 further includes a front wheel generally indicated at 104 and a rear wheel generally indicated at 106. The wheels 104, 106 are of conventional construction and include inflatable balloon tires 108 and filler stems 110. Bicycle 100 further includes a tubular front fork 120 of conventional construction for mounting the front wheel 104. A conventional pedal crank assembly is generally indicated at 122 and includes foot pedals 124.

Bicycle frame 102 includes a front tube portion 128 for mounting the fork 120. Frame 102 further includes a seat tube 130 and a rear tube 132 which are joined at a mounting portion 134 for mounting the pedal rank assembly. A diagonal tubular frame portion 1 extends from the front tube 128 to mounting portion 134 in a conventional manner, to provide framework support for the bicycle and its rider. The frame portion 1, as with the seat tube 130, rear tube 132 and front tube 128 are made of hollow cylindrical tubing of either a metal or composite material, as is known in the art.

The tubular frame portion 1 includes an inner wall surface 140 defining the hollow interior of the tube. Tubular frame portion 1 further defines a slot 8 extending in the longitudinal direction of the tubular frame portion, preferably facing the rider. Tubular frame portion 1 further includes a connection member 144 located at an outlet communicating with the interior of the tubular frame portion. A plunger or piston 4 is mounted for reciprocation within tubular frame portion 1 and is in sealing engagement with the interior wall surface 140. An operating rod is attached at one end to piston 4 and at the other end to the protrusion 150 extending through slot 8 so as to extend outside of the tubular frame portion 1. Optionally, additional finishing to internal wall surface 140 is provided to enhanced its sealing engagement with plunger 4.

In the preferred embodiment, an enlarged handle 6 functioning either as a hand operated member or a foot operated pedal is attached to the protrusion 150. A gland 5 is secured within the tubular frame portion by screw members or other conventional fasteners. The operating rod 2 passes through the central aperture in gland 5 and helps to guide the operating rod as the plunger is moved back and forth as indicated by the solid and dotted lines in FIG. 1. Spring 8 biases the piston in the upward direction, to the rest position indicated in solid lines in FIG. 1. As the handle 6 is depressed in the manner indicated, the piston 4 is moved toward outlet 144 compressing air within the tubular frame portion and delivering pressurized air to the connection member. In the preferred embodiment, the connection member 144 provides a threaded fitting for a hose to couple air pressure to the filler stem 110 of the front wheel 104, or, alternatively, to the filler member 110 of rear wheel 108. If desired, the internal wall 140 can be machined so as to provide better sealing contact with piston 4 or, alternatively, a thin sleeve may be installed within the tubular frame portion for this purpose. In the embodiment shown in FIG. 1, an access plate 7 is provided in front tube 128 for insertion of the plunger, gland, operating rod and spring after the bicycle frame is assembled in a conventional manner, using welding, brazing or similar techniques.

In an alternative embodiment illustrated in FIG. 2, the tubular frame portion 1 is cut out so as to form a gate or door 3 hingedly joined to the tubular frame portion with conventional hinge means. In the embodiment as shown in FIG. 2, slot portions 8 are cut both in the tubular frame portion and in the door 3, while gland portions 5a, 5b are carried in the door 3 and tubular frame portion 1, respectively. In FIG. 2, an alternative handle 6' is mounted to one end of operating rod 2.

In FIG. 3, an electrical device such as a motor or solenoid 11 having an internal switch mechanism operated by a protruding member 12 is mounted within tubular frame portion 1 and is coupled to one end of operating rod 2. The device 11 is electrically energized by a power source, such as a battery 160, electrically coupled to the device 11 by conductors 162. Upon depressing the protruding member 12, the device 11 is energized so as to urge the operating rod in a downward direction, compressing air within the tubular frame portion 1 by plunger 4, as described above. At the end of the operating cycle, energization of the device 11 is discontinued, allowing spring 9 to return piston 4 to its rest position adjacent gland 5.

In the arrangement shown in FIG. 4, operating rod 2 is provided with a toothed portion 15 mounted at its upper, free end by conventional bearings 16. A gear 14 is mounted within a housing 164 located outside of tubular frame portion 1. Gear 14 protrudes beyond tubular frame portion 1. A crank and handle assembly 13 is joined to the center of gear 14 and is used to drive the gear in a desired direction. Gear 14 is meshed with toothed portion 15 so that as the gear is driven in a first direction, toothed portion 15 is driven in a downward direction, causing piston 4 to compress air within tubular frame portion 1. Pressure is then released from the crank and handle assembly 13 to allow spring 9 to return piston 4 to its rest position as illustrated in FIG. 4, adjacent gland 5. If desired, a clutch arrangement can be employed with the gear so as to render the gear freewheeling when the toothed portion 15 is urged in an upward direction by spring 9.

In the embodiments described above, the piston 4 is moved in a downward direction, compressing air within tubular frame portion 1, delivering pressurized air to the fitting 144. It will be appreciated that the bicycle frame can be fabricated with a minimum expense, using conventional techniques, since minimal modification to a conventional bicycle frame construction is required.

Although in the preferred embodiment, the hollow tube is shown as a diagonal frame portion 30 extending between the steering tube 7 and the pedal mounting portion 20 the air pump could also be mounted within the seat supporting tube 22 extending from the pedal mounting portion 20 to a seat for supporting the rider (not shown). The pump could also be mounted in the rear tube 24 for supporting the rear wheel 26 or it could be mounted in a hollow tubular portion 28 of the steering fork 30.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. An air pump assembly for a bicycle comprising, in combination:

a bicycle frame member having a hollow tubular body portion with an inside wall and defining a slot and an outlet aperture;

a pump shaft within the body portion;

a pump seal carried by the pump shaft disposed in sealing engagement with the inside wall of the body portion;

a handle means attached to the pump shaft extending through the slot so as to be accessible for movement by an operator; and an enlarged knob comprising a foot pedal carried on the end of the handle;

whereby air pressure is developed at the outlet aperture when the handle means is moved.

2. The air pump according to claim 1 further comprising coupling means attached to the bicycle frame adjacent the outlet aperture for coupling air pressure at the outlet aperture to an external conduit which is external of the body portion.

3. The air pump according to claim 1 further comprising a spring within the hollow tubular portion to return the pump shaft to its starting position after movement by an operator.

4. The air pump according to claim 1 wherein the bicycle frame member further comprises a fork member for mounting a wheel and a handlebar.

5. An air pump for a bicycle comprising, in combination:

a bicycle frame member having a hollow tubular body portion with an inside wall and defining a slot;

a pump shaft within the body portion;

a pump seal carried by the pump shaft disposed in sealing engagement with the inside wall of the body portion;

a motor carried by the bicycle frame member, coupled in driving engagement with the pump shaft to move the pump shaft within the hollow tubular body;

whereby air pressure is developed at the outlet aperture when the pump shaft is moved by the motor.

6. The air pump according to claim 5 further comprising coupling means attached to the bicycle frame adjacent the outlet aperture for coupling air pressure at the outlet aperture to an external conduit which is external of the body portion.

7. The air pump according to claim 5 wherein the bicycle frame member further comprises a fork handlebar stem tube of the bicycle.

8. An air pump for a bicycle comprising, in combination:

a bicycle frame member having a hollow tubular body portion with an inside wall and defining a slot and an outlet aperture;

a pump shaft within the body portion and having a toothed part;

a pump seal carried by the pump shaft disposed in sealing engagement with the inside wall of the body portion; and a crank means with teeth engaging the toothed part of the pump shaft, the crank carried by the bicycle frame member; whereby air pressure is developed at the outlet aperture when the crank means moves.

9. The air pump according to claim 8 wherein the bicycle frame member further comprises a fork handlebar stem tube of the bicycle.

10. The air pump according to claim 8 further comprising coupling means attached to the bicycle frame adjacent the outlet aperture for coupling air pressure at the outlet aperture to an external conduit which is external of the body portion.

\* \* \* \* \*